(12) United States Patent
Mutert

(10) Patent No.: US 7,731,134 B1
(45) Date of Patent: Jun. 8, 2010

(54) BAG STAND

(75) Inventor: George Mutert, Belvedere, IL (US)

(73) Assignee: Resourceful Bag & Tag, Inc., Palos Heights, IL (US)

(*) Notice: Subject to any disclaimer, the term of this patent is extended or adjusted under 35 U.S.C. 154(b) by 359 days.

(21) Appl. No.: 11/397,147

(22) Filed: Apr. 4, 2006

Related U.S. Application Data

(63) Continuation-in-part of application No. 10/965,619, filed on Oct. 14, 2004, now Pat. No. 7,032,868.

(60) Provisional application No. 60/510,998, filed on Oct. 14, 2003.

(51) Int. Cl.
B65B 67/12 (2006.01)

(52) U.S. Cl. .......................... 248/99; 248/97

(58) Field of Classification Search ............. 248/95, 248/97, 99, 98, 100
See application file for complete search history.

(56) References Cited

U.S. PATENT DOCUMENTS

| | | | |
|---|---|---|---|
| 63,383 A | 4/1867 | Hanks | |
| 100,123 A | 2/1870 | Crofoot | |
| 102,616 A | 5/1870 | Sweigert | |
| 447,686 A | 3/1891 | Holladay | |
| 653,035 A | 7/1900 | Noble | |
| 1,022,862 A | 4/1912 | McMillen | |
| 2,470,977 A | 5/1949 | Chidsey | 248/97 |
| 3,286,752 A * | 11/1966 | Duryee, Jr. | 220/9.3 |
| 3,502,291 A | 3/1970 | Ackerman et al. | 248/97 |
| 3,633,932 A * | 1/1972 | Holden | 280/641 |
| 3,659,816 A | 5/1972 | Wilson | 248/97 |
| 3,948,474 A * | 4/1976 | Pomroy | 248/99 |
| 4,318,520 A * | 3/1982 | Walker | 248/97 |
| 4,354,543 A * | 10/1982 | Bogner | 220/9.4 |
| 4,467,989 A * | 8/1984 | Stroh | 248/97 |
| 4,593,873 A * | 6/1986 | Nelson | 248/98 |
| 4,613,104 A | 9/1986 | Garrott | 248/97 |
| 4,664,445 A * | 5/1987 | Groseth | 297/302.7 |
| 4,697,771 A * | 10/1987 | Majors | 248/97 |
| 4,711,367 A * | 12/1987 | Albertson | 229/117.12 |
| 4,723,741 A * | 2/1988 | Doering | 248/97 |
| 4,793,628 A * | 12/1988 | Haley, Sr. | 280/641 |
| 4,953,815 A | 9/1990 | Beymer | 248/97 |
| 4,976,406 A * | 12/1990 | Buckley et al. | 280/641 |
| 5,360,189 A | 11/1994 | Hart | 248/97 |
| 5,411,229 A | 5/1995 | Hoefkes | 248/97 |
| 5,570,862 A | 11/1996 | Nugent | 248/97 |

(Continued)

*Primary Examiner*—J. Allen Shriver, II
*Assistant Examiner*—Steven M Marsh
(74) *Attorney, Agent, or Firm*—Howard & Howard Attorneys PLLC

(57) ABSTRACT

An apparatus or bag stand has at least one elongated bail having a pair of oppositely extending ears at each end for supporting and holding open a bag. An elongated slot is defined at least in part by the bail and co-extends therewith. Preferably, a support base elevates the bail in a substantially horizontal position allowing the bag to drape generally freely and downward from the bail. An external face of the bag contacts the portion of the support base that generally defines in part the slot as a portion of a continuous peripheral edge of the bag extrudes through the slot. The extruded portion of the peripheral edge is generally flipped or overturned about the bail and preferably tucked behind the ears so that an internal face of the bag is in contact with and generally encompasses the bail.

18 Claims, 5 Drawing Sheets

U.S. PATENT DOCUMENTS

| | | | |
|---|---|---|---|
| 5,799,908 A | 9/1998 | Downs | 248/97 |
| 6,076,782 A | 6/2000 | Alderman | 248/97 |
| 6,116,549 A | 9/2000 | Santa Cruz | 248/97 |
| 6,334,593 B2 | 1/2002 | Inoue | 248/95 |
| 6,491,264 B1 | 12/2002 | Valesquez | 248/97 |
| D468,138 S | 1/2003 | Briggs | D6/496 |
| D468,563 S | 1/2003 | Briggs | D6/496 |
| 6,508,443 B1 | 1/2003 | Andreasson | 248/97 |
| 6,511,026 B2 | 1/2003 | Hatfield | 248/97 |
| D471,082 S | 3/2003 | Scola | D8/373 |
| 6,705,575 B1 * | 3/2004 | Hoy | 248/99 |
| 7,032,868 B2 * | 4/2006 | Mutert | 248/99 |
| 2002/0104932 A1 | 8/2002 | Johnston | 248/97 |

* cited by examiner

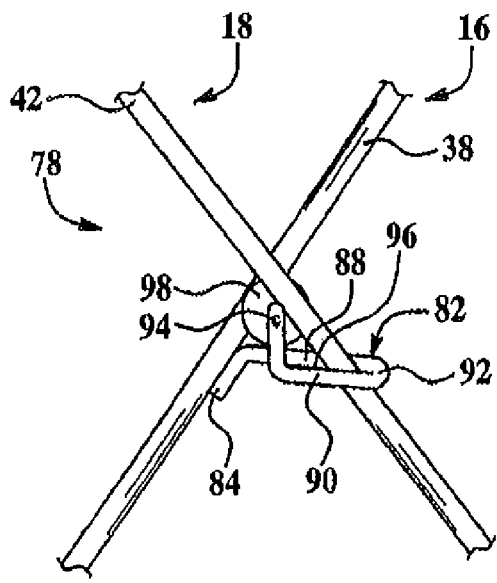
Figure 5
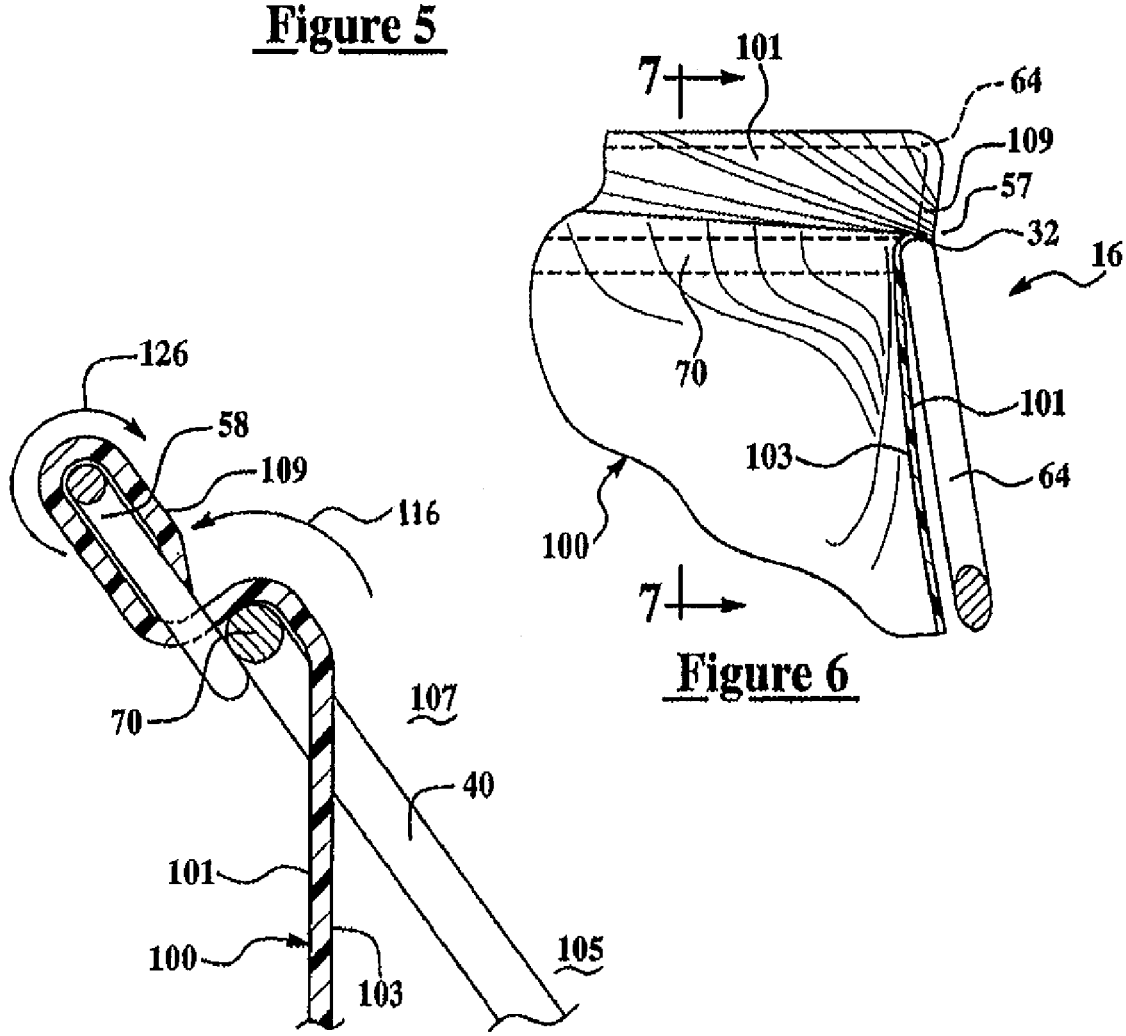
Figure 6
Figure 7

BAG STAND

CROSS REFERENCE TO RELATED APPLICATIONS

This United States continuation-in-part application claims the benefit of the parent application Ser. No. 10/965,619, filed on Oct. 14, 2004 now U.S. Pat. No. 7,032,868 which claims the benefit of U.S. provisional patent application Ser. No. 60/510,998, filed on Oct. 14, 2003.

FIELD OF THE INVENTION

The invention generally relates to a bag stand and more specifically to a collapsible bag stand for supporting and holding open a bag for filling.

BACKGROUND OF THE INVENTION

Portable refuse and recycling containers are well known in the art. Typical containers consist of wheeled carts formed from PVC or another suitable polymeric material. Such carts are cumbersome to move, difficult to empty and must be thoroughly rinsed after each use. Various bins and barrels are also used for collecting and storing recyclable materials; however, such containers typically have rigid, opaque sides that conceal the contents of the containers, thus increasing the likelihood that refuse and recyclable materials will be inadvertently deposited and mixed together within a single container.

While containers exist which are intended for use with disposable plastic bags, such containers are not designed to permit simple installation and removal of the bags therefrom. To the contrary, the components used in such containers often fail to effectively engage the bags or maintain the bags in a stationary position relative thereto. Because the bags are inadequately secured to the containers, the bags tend to rip away from the containers soon after the bags begin to fill with recycled materials. Such containers are also difficult and time consuming to assemble and distribute, which makes them unsuitable for use at special events or other large scale public gatherings.

SUMMARY OF THE INVENTION

An apparatus or bag stand has at least one elongated bail having a pair of oppositely extending ears at each end for supporting and holding open a bag. An elongated slot is defined at least in part by the bail and co-extends therewith. Preferably, a support base elevates the bail in a substantially horizontal position allowing the bag to drape generally freely and downward from the bail. An external face of the bag contacts the portion of the support base that generally defines in part the slot as a portion of a continuous peripheral edge of the bag extrudes through the slot. The extruded portion of the peripheral edge is generally flipped or overturned about the bail and preferably tucked behind the ears so that an internal face of the bag is in contact with and generally encompasses the bail.

The bag stand preferably has first and second legs that are pivotable with respect to one another about a pivot axis. The first and second legs pivot between a collapsed position and an erected position. In the collapsed position, the first and second legs are substantially aligned with respect to one another and can be stored. In the erected position, the first and second legs are transverse with respect to one another and can receive a bag. The bag stand also includes first and second incurvate portions defined by each of the first and second legs. The first and second incurvate portions are spaced from the pivot axis and from each other. The ears of the bails(s) preferably resemble first and second excurvate portions defined by each of the first and second legs. The first and second excurvate portions are substantially coplanar with the first and second incurvate portions of the respective leg and are spaced from said pivot axis and from each other. An opening of the bag is received at the first and second excurvate portions and supported during filling.

Preferably, at least one hinge member generally pivotally engages the first leg to the second leg. The hinge member preferably includes an elongated wire member fixedly engaged with one of the first and second legs and substantially encircling the other of the first and second legs. The hinge member also has a washer member rotatably encircling the elongated wire member and fixedly associated with the other of said first and second legs. A modification of the support base of the bag stand generally utilizes a vertical plate constructed and arranged to attach to any convenient substantially vertical surface.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is an enlarged side view of a hinge member of the bag stand;

FIG. 6 is a partial perspective view of a bag supported at one corner or ear of the bag stand;

FIG. 7 is a partial cross section of the bag stand taken along line 7-7 of FIG. 6;

DETAILED DESCRIPTION OF THE EXEMPLARY EMBODIMENT

Figure 1:
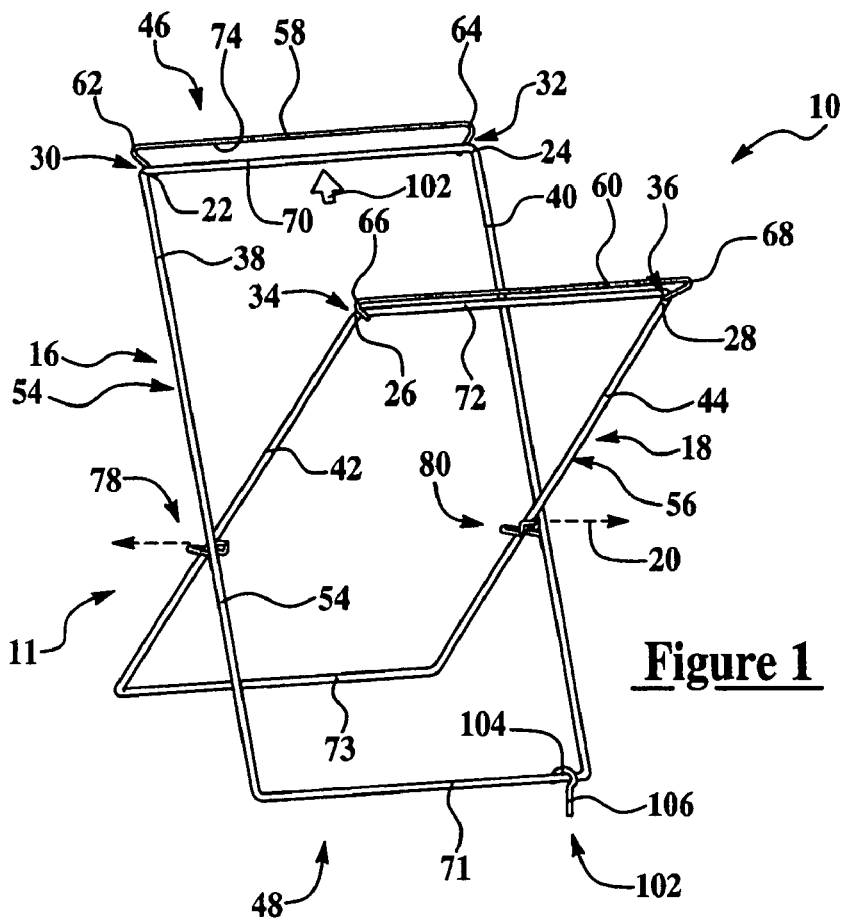
FIG. 1 is a perspective view of a bag stand embodying the present invention and shown in an erected position.
Figure 2:
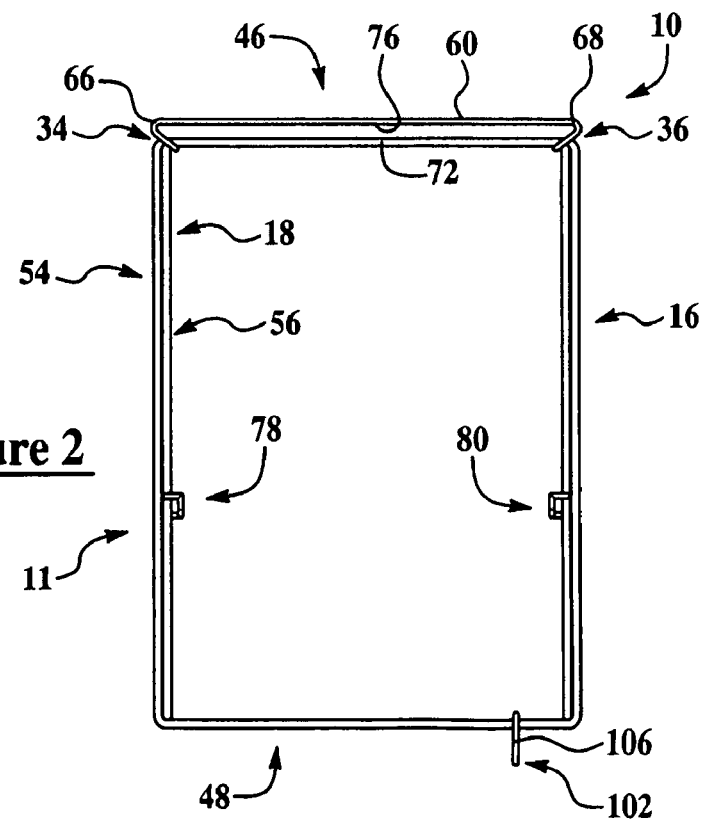
FIG. 2 is a side view of the bag stand when in the erected position.

Referring to FIGS. 1-7, a bag stand or support 10 embodying the present invention has a support base 11 capable of standing in an erected position and at least one and preferably two bails 58, 60 preferably welded to the support base 11 for draping or hanging a bag 100 in a generally open state for receipt of material to be recycled, discarded, stored or otherwise bagged. Preferably, the support base 11 is collapsible for easy and compact storage when not in use. The base 11 has a substantially rectangular outer frame member 54 attached to the first bail 58 and a substantially rectangular inner frame member 56 attached to the second bail 60. The bag stand 10 is preferably of a tubular or rod-like design with a first frame or leg 16 comprising the first bail 58 and the outer frame member 54 and a similar second frame or leg 18 comprising the second bail 60 and the inner frame member 56. The first leg 16 is in a pivoting relationship with the second leg 18 for movement between the erected position and a collapsed position. When in the erected position, as best shown in FIGS. 1 and 7, the bag stand 10 supports and holds open the bag 100, and when in the collapsed position (not shown), the bag stand 10 is compact for efficient storage.

The outer frame member 54 of leg 16 has a pair of substantially straight portions 38, 40 that are preferably orientated parallel to one another, an elongated top member 70 extending between first ends of the respective straight portions 38, 40, and an elongated bottom member 71 extending between the opposite second ends of the straight portions 38, 40. The connection between the first end of straight portion 38 of outer frame member 54 and the first end of top member 70 forms a substantially right angle bend or a first incurvate portion 22 and the connection between the first end of the straight portion 40 and the opposite second end of top member 70 forms a substantially right angle bend or a second incurvate portion 24 of the outer frame member 54. The incurvate portions 22, 24, 26, 28 respectively curve inward from the adjacent straight portions 38, 40, 42, 44 of the frame members 54, 56 of the respective legs 16, 18.

The inner frame member 56 of leg 18 has a pair of substantially straight portions 42, 44, which are preferably orientated parallel to one another, an elongated top member 72 extending between first ends of the respective straight portions 42, 44 and an elongated bottom member 73 extending between opposite second ends of the respective straight portions 42, 44. The connection between the first distal end of straight portion 42 of inner frame member 56 and the first end of top member 72 forms a substantially right angle bend or a first incurvate portion 26 and the connection between the first end of straight portion 44 and the opposite second end of top member 72 forms a substantially right angle bend or a second incurvate portion 28 of the inner frame member 56.

The first leg 16 of the bag stand 10 also includes a first excurvate portion 30 located adjacent to the first incurvate portion 22 and carried in-part by the first end of the elongated member 70 of the outer frame member 54 and in-part by a first end of the bail 58. Similarly, a second excurvate portion 32 located adjacent to the second incurvate portion 24, is carried in-part by the opposite second end of the elongated member 70 and in-part by an opposite second end of the bail 58. The second leg 18 of the bag stand 10 has a first excurvate portion 34 located adjacent to the first incurvate portion 26 and carried in-part by the first end of the elongated member 72 of the inner frame member 56 and in-part by a first end of the bail 60. Similarly, a second excurvate portion 36 located adjacent to the second incurvate portion 28, is carried in-part by the opposite second end of the elongated member 72 and in-part by an opposite second end of the bail 60. The excurvate portions 30, 32, 34, 36 respectively curve outward with respect to the straight portions 38, 40, 42, 44 and the incurvate portions 22, 24, 26, 28 of the legs 16, 18. The first and second excurvate portions 30, 32, 34, 36 are substantially coplanar with the first and second incurvate portions 22, 24, 26, 28 of the respective legs 16, 18.

The bail 58 of the leg 16 has third and fourth incurvate portions 62, 64 that profile a pair of ears for gripping the bag 100. The first excurvate portion 30 is located between the first incurvate portion 22 and the third incurvate portion or ear 62. The second excurvate portion 32 is located between the second incurvate portion 24 and the fourth incurvate portion or ear 64 of leg 16. The bail 58 also has a first side and an opposite second side with a first slot 74 communicating through the first and second sides and co-extending longitudinally along the bail 58. The bail 60 of the leg 18 has third and fourth incurvate portions 66, 68 that also profile a pair of ears for gripping the bag 100 at a location diametrically opposite to the bail 58 and with respect to the opening of the bag 100. The first excurvate portion 34 is located between the first incurvate portion 26 and the third incurvate portion 66. The second excurvate portion 36 is located between the second incurvate portion 28 and the fourth incurvate portion 68 of leg 18. The bail 60 is diametrically opposed to the bail 58 with respect to the opening 107 and also includes a first side and an opposite second side. A second slot 76 communicates through the first and second sides of the bail 60 and co-extends longitudinally along the bail 60.

Figure 3:
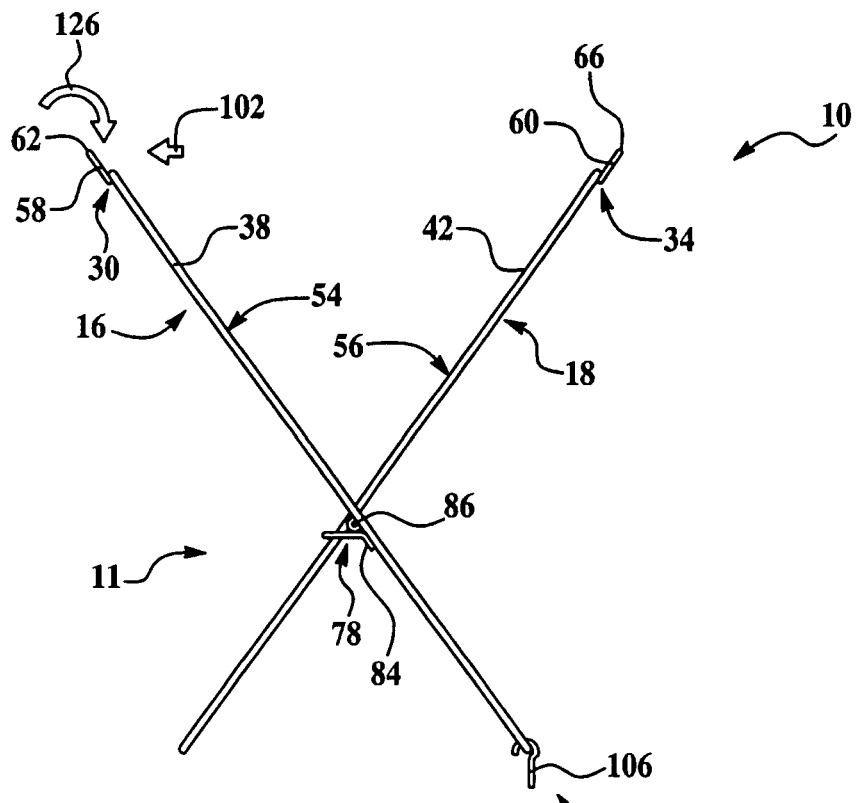
FIG. 3 is a front view of the bag stand in the erected position.
Figure 4:
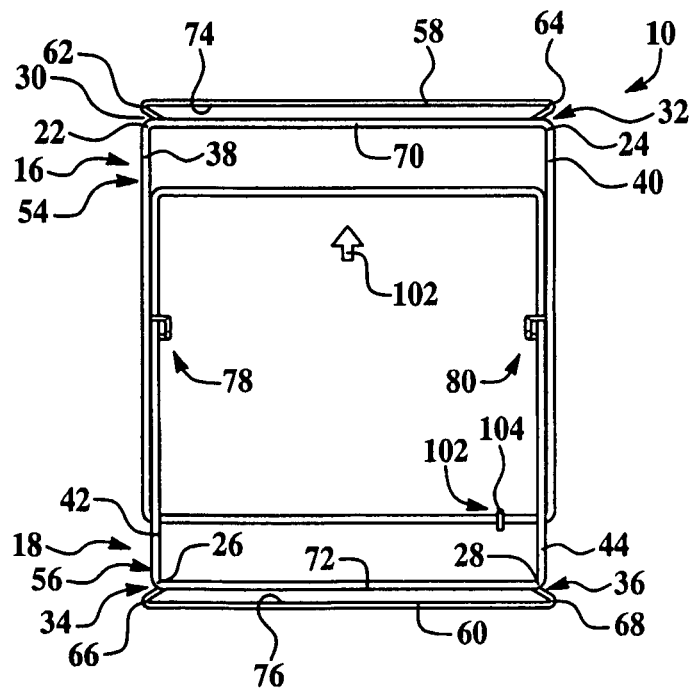
FIG. 4 is a top view of the bag stand.

As best illustrated in FIGS. 1 and 3, the outer frame member 54 of leg 16 lies in a first imaginary plane and the bail 58 of leg 16 lies within a second imaginary plane that is closely spaced and substantially parallel to or coplanar with the first imaginary plane. Consequently, the first and second incurvate portions 22, 24 of the outer frame member 54 lie in the first imaginary plane and the third and fourth incurvate portions 62, 64 of the bail 58 lie in the second imaginary plane. Similarly, the inner frame member 56 of leg 18 lies in a third imaginary plane and the bail 60 of leg 18 lies in a fourth imaginary plane that is closely spaced and substantially parallel to or coplanar with the third imaginary plane. Consequently, the first and second incurvate portions 26, 28 of the inner frame member 54 lie in the third imaginary plane and the third and fourth incurvate portions 66, 68 lie in the fourth imaginary plane. Because the first and second imaginary planes are substantially coplanar, the first and second excurvate portions 30, 32 of the first leg 16 are generally planar with the incurvate portions 22, 24, 62, 64, and because the third and fourth imaginary planes are substantially coplanar, the first and second excurvate portions 34, 36 of the second leg 18 are generally planar with the incurvate portions 26, 28, 66, 68.

When the bag stand 10 is in the erect position, the first and third imaginary planes of the respective outer and inner frame members 54, 56 intersect one-another generally along a pivot axis 20 (see FIG. 1). As such, the pivot axis 20 is substantially horizontal and the legs 16, 18 angle upward at substantially opposite angles from the respective bottom members 71, 73 of the outer and inner frame members 54, 56 to the respective bails 58, 60 at a top 46. The pivot axis 20 is located substantially at mid-length to the frame member 54, 56 thus placing the first and second incurvate portions 22, 24, 26, 28 are spaced from the pivot axis 20 and from each other. The first and second incurvate portions 22, 24, 26, 28 are disposed generally at a top 46 of the bag stand 10.

As best illustrated in FIGS. 1 and 5, the bag stand 10 preferably includes a first hinge member 78 that pivotally couples the straight portion 38 of outer frame member 54 to the straight portion 42 of inner frame member 56, and a second hinge member 80 that couples the straight portion 40 of outer frame member 54 to the straight portion 44 of inner frame member 56. For clarity and as best illustrated in FIG. 5, the structure of the first hinge member 78 will be described in detail, however each of the first and second hinge members 78, 80 are constructed similarly and are mirror images of one another. The first hinge member 78 includes an elongated wire member 82 engaged fixedly to the straight portion 38 of the first leg 16 and substantially encircling the straight portion 42 of the second leg 18. A first end 84 and an opposite end 86 (see FIG. 3) of the elongated wire member 82 are preferably welded to the straight portion 38. Both hinge members 78, 80 are welded to the same leg 16. Substantially linear portions 88, 90 of the elongated wire member 82 extend parallel to one another and cooperate to define a path 96 therebetween for restricting movement of the straight portion 42 of the second leg 18. An arcuate portion or stop 92 of the elongated wire member 82 is disposed between and connects the ends of the linear portions 88, 90. The arcuate portion 92 limits the travel of the second leg 18 along the path 96. A bent portion 94 of the wire member 82 has first and second segments orientated at an approximate right angle to one another. As illustrated in FIG. 5, the first segment angles upward from the linear portion 90 to the second segment that is preferably welded to the straight portion 38 of the first leg 16. The second segment of the bent portion 94 coextends with the pivot axis 20, lies in an imaginary plane orientated substantially parallel to an imaginary plane that extends through the linear portions 88, 90, and is orientated substantially perpendicular to the path 96.

The first and second hinge members 78, 80 also include a washer member 98 rotatably encircling the second segment of the bent portion 94 of the elongated wire member 82. The washer member 98 is preferably fixed to the straight portion 42 of the second leg 18 acting as a spacer between the outer and inner frame members 54, 56 and to restrict the hinge members 78, 80 to rotational movement only. During movement of the first and second legs 16, 18 relative to one another from the second position, shown in FIGS. 1-7, to the first position, the washer member 98 and second leg 18 concurrently rotate about the bent portion 94 and pivot axis 20.

In operation, the bag stand 10 can be retrieved from storage while in the collapsed position (not shown) and pivoted into the erected position. The second leg 18 and attached washer members 98 are rotated about the second segment of the bent portion 94 about the pivot axis 20 moving the straight portions 42, 44 along the paths 96 until they contact the arcuate portions 92. To further enhance stability of the bag stand 10 during filling of the bag 100, one or more anchors 102 preferably secure the bottom member(s) 71, 73 of the bag stand 10 to the ground. The anchor 102 includes a hook portion 104 that engages one or both members 71, 73, and a stake portion 106 extending from the hook portion. During assembly, the stake portion 106 is driven into the ground for anchorage. When the bag stand 10 is fully erected, the elongated members 71, 73 located at a bottom 48 rest upon the ground or floor in a substantially horizontal position for stability.

Figure 8:
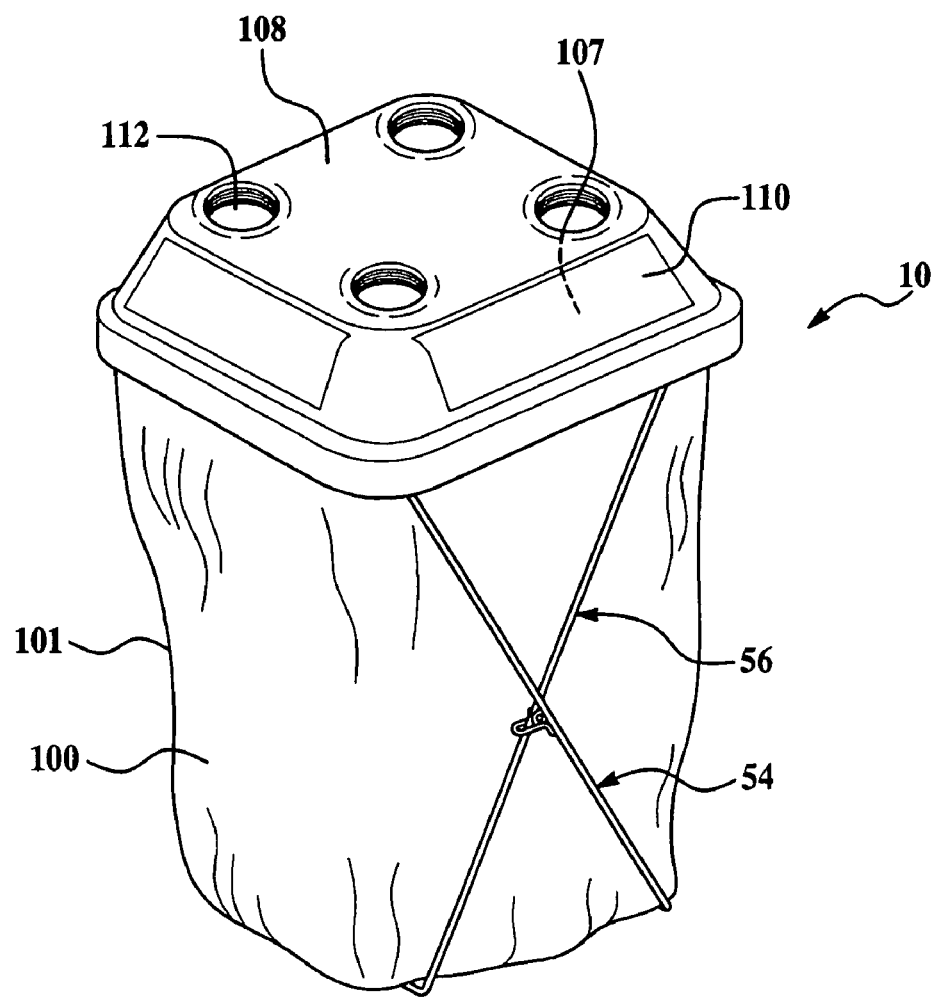
FIG. 8 is a perspective view of the bag stand supporting a bag and a cover of the bag stand.

The bag stand 10 supports a bag 100 preferably made of a slightly stretchable and resilient material such as plastic. As best illustrated in FIGS. 6-8, the bag 100 has an external face 101 and an internal face 103 defining a chamber 105. An opening 107 generally defined by a continuous peripheral edge 109 of the bag 100 communicates with the chamber 105. When attaching the bag 100 to the bag stand 10, circumferentially spaced portions of the peripheral edge of the bag 100 are moved through the respective slots 74, 76 in the direction 116, from inside the bag stand 10 to the outside of the bag stand 10 (see FIG. 7). The peripheral edge 109 of the bag 100 is pulled over and around the diametrically opposed bails 58, 60 and over the third and fourth incurvate portions or ears 62, 64, 66, 68 along direction 126. The resilient force of the peripheral edge 109 of the bag 100 then biases the bag edge in first and second excurvate portions or notches 30, 32, 34, 36. When the bag 100 is fully fitted to the bag stand 10, the external face 101 at the circumferentially spaced portions of the peripheral edge 109 are in direct contact with the circumferentially spaced (with respect to opening 107) elongated members 70, 72 of respective legs 16, 18. This contact creates frictional forces between the bag 100 and support base 11 that relieves stresses otherwise placed upon the bail ears 62, 64, 66, 68. The internal face 103 of the bag 100 is in direct contact and generally envelopes the bails 58, 60 of respective legs 16, 18. The bag 100 can have any suitable dimension. One example of bag 100 is a sixty gallon, 1.25 mil plastic bag.

To enhance the aesthetic appeal of the bag stand 10, a cover 108 can be sized to concurrently extend around the bails 58, 60. The cover 108 can display indicia 110. The indicia 110 can be formed integrally on the cover or connected to the cover, releasably or fixedly. The cover 108 defines at least one aperture 112 for receiving refuse. The aperture 112 can be sized to correspond to a particular kind of refuse, such as a can or bottle. A plurality of spaced apertures 112 can extend through the cover 108 for permitting multiple aluminum cans, glass bottles or other recyclable to be simultaneously inserted into one or a plurality of bags 100.

Figure 9:
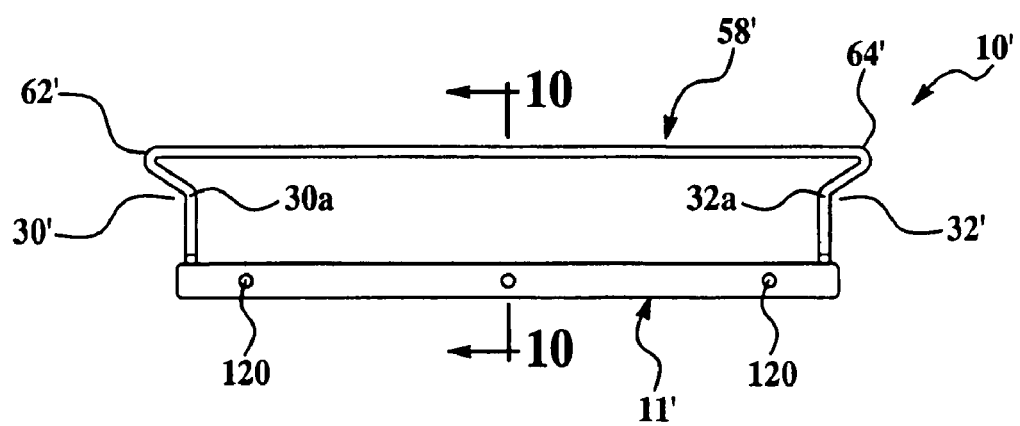
FIG. 9 is a rear view of a modified bag stand.
Figure 10:
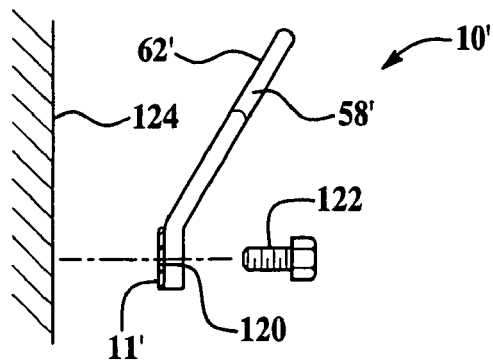
FIG. 10 is a cross section of the modified bag stand taken along line 10-10 of FIG. 9.
Figure 11:
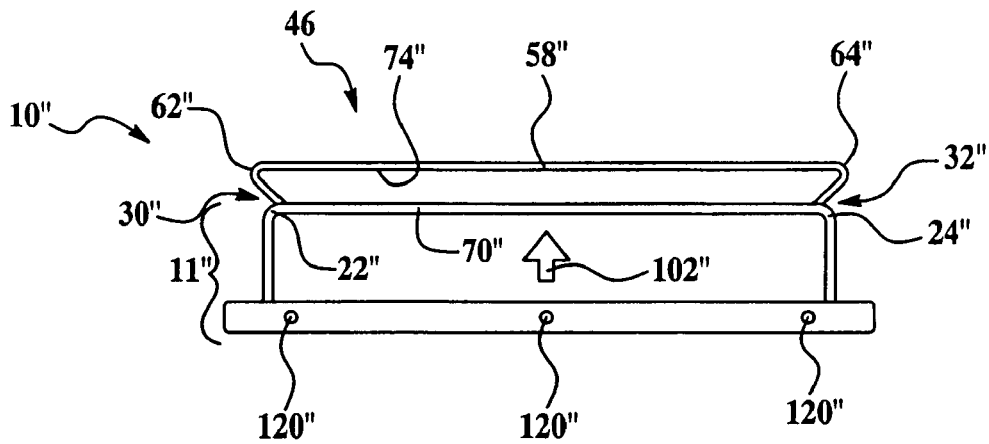
FIG. 11 is a rear view of a second modified bag stand.

As best illustrated in FIGS. 9-10, a modified bag stand 10' has a support base 11' and a bail 58'. The support base 11' is a substantially vertical plate preferably having a plurality of apertures 120 for extending fasteners 122 therethrough to engage to a substantially vertical surface or wall 124 carried by any variety of structures including a refuse can. Preferably, the bail 58' angles in an upward direction from the support base 11' and away from the wall 124 thereby creating a clearance between the wall 124 and bail 58' for inserting the bag 100 through a bail slot 74'. The bag stand 10' does not utilize the friction inducing elongated members 70, 72 of bag stand 10. Instead, a tip sill of wall 124 could suffice to produce resistance to gravitational pull. Alternatively, the bail 58' can be property sized longitudinally to increase tension in the bag 100 that would resist any tendency of the bag 100 pulling off of the ears 62', 64'. As best illustrated in FIG. 11, a second modified bag stand 10" has a friction inducing elongated member 70" similar to bag stand 10.

Figure 12:
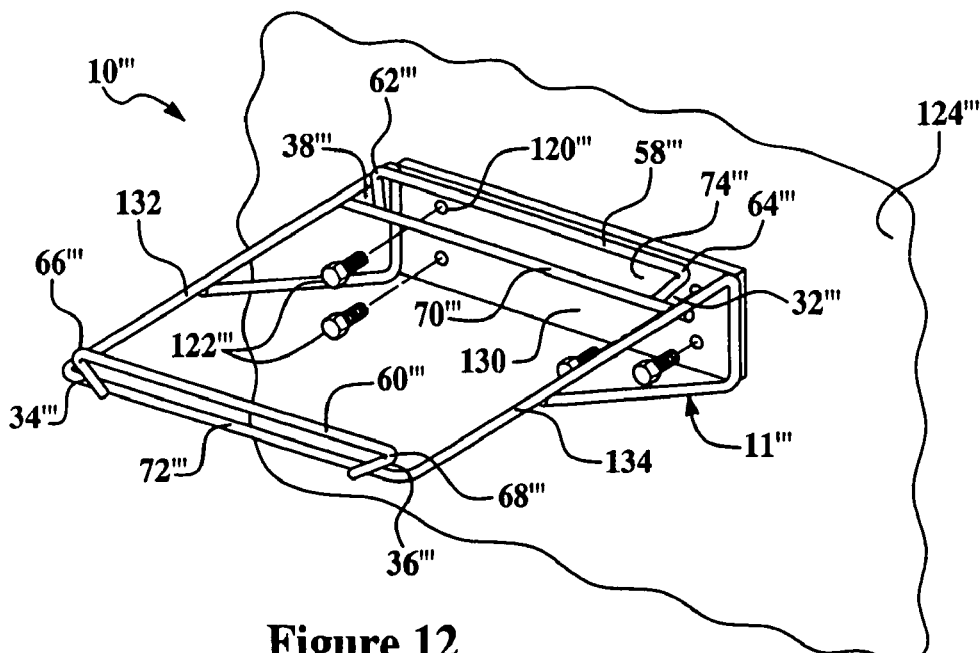
FIG. 12 is a perspective view of a third modified bag stand.

As best illustrated in FIG. 12 a third modified bag stand 10''' has a support base 11''' that generally cantilevers bails 58''', 60''' from any variety of vertical structures including, for example, a wall or a door. The support base 11''' has a substantially vertical plate 130 attached to a vertical surface 124''' by a plurality of preferably threaded fasteners or screws 122''' extending through apertures 120''' in the plate 130. Projecting horizontally outward from the plate 130 are two arms 132, 134. The arms 132, 134 are substantially parallel to one another and spaced apart by two elongated members 70''', 72''' at opposite ends forming a rectangular and horizontal frame for the bag 100 to drape through. Engaged to each member 70''', 72''' are respective bails 58''', 60''' with respective ears 62''', 64''', 66''', 68''' and respective notches 30''', 32''', 34''', 36''' for resilient engagement to the peripheral edge 109 of the bag 100.

For manufacturing cost, weight and strength considerations, the bag stands 10, 10', 10" and 10''' are preferably formed from rod or tubing made of metal, molded plastic or wood. As illustrated for bag stand 10, the legs 16, 18 are formed from bended metal rod stock of three-eighth inch gauge steel. One skilled in the art, however, would now know that the size of metal stock can vary and is dependent in part by the load carrying requirements of the bag stand and other factors such as weight and cost. Furthermore, one skilled in the art would now know that the bails 58, 60 could be made of plate stock as opposed to rod stock with a slot 74, 76 cut into the plate bails for insertion of the bag 100.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For instance, the bag stand is not limited to one or two bails but can include three or more bails circumferentially spaced from one another. Therefore, it is intended that the invention not be limited to the particular embodiment disclosed as the best mode contemplated for carrying out this invention, but that the invention will include all embodiments falling within the scope of the appended claims.

What is claimed is:

1. A bag stand for removably supporting and holding open a bag having an external face, an internal face defining a chamber, and a peripheral edge defining an opening into the chamber, the bag stand comprising:
   an elongated first bail having a first ear projecting longitudinally from one end, a second ear projecting longitudinally from an opposite end, a first side and an opposite second side;
   a first slot communicating through the first and second sides and co-extending longitudinally along the first bail;
   a support base engaged to the first bail for suspending the bag when removably attached to the first bail;
   wherein at least a portion of the peripheral edge projects through the first slot with the internal face being in direct contact with the first and second sides;
   an elongated first member of the support base disposed substantially parallel to the first bail, defining in-part the first slot, and wherein the external face is in direct contact with the first member;
   an elongated second bail being diametrically opposed to the first bail with respect to the opening;
   an elongated second member of the support base disposed substantially parallel to the second bail;
   a second slot co-extending longitudinally along the second bail;
   a first leg extending from said first member;
   a second leg extending from said second member with said first and second legs pivotable with respect to one another about a pivot axis between a first position wherein said first and second legs are substantially aligned with respect to one another and a second position wherein said first and second legs are transverse with respect to one another wherein each of said first and second legs defines a substantially rectangular frame including said first and second frame members and said first and second bails.

2. The bag stand set forth in claim 1 wherein said first and second frame members and said first and second bails of each of said first and second legs are welded together.

3. The bag stand set forth in claim 1 further comprising first and second hinge members pivotally engaging said first and second legs including an elongated wire member engaged fixedly with one of said first and second legs and substantially encircling the other of said first and second legs and a washer member rotatably encircling said elongated wire member and associated fixedly with said other of said first and second legs.

4. The bag stand set forth in claim 1 wherein the first bail extends further longitudinally than the first slot.

5. The bag stand set forth in claim 1 further comprising a cover disposed over the opening, supported by the first and second bails and being in direct contact with the external face when the bag is attached to the first and second bails.

6. The bag stand set forth in claim 1 further comprising a vertical plate of the support base for engagement to a substantially vertical surface with the elongated first and second bails being substantially horizontal and spaced outward from the vertical plate.

7. The bag stand set forth in claim 1 wherein the first and second bails are substantially longitudinally horizontal and angle laterally away from the opening as the first and second bails project upward.

8. A support for removably supporting and holding open a bag having an external face, an internal face defining a chamber, and a peripheral edge defining an opening into the chamber, said support comprising:
   a frame member having a first substantially straight portion and a second substantially straight portion spaced from said first straight portion;
   an elongated bail having a first ear projecting from a first end and a first side extending from said first ear to couple to said first straight portion for coupling said first end of said bail to said first straight portion;
   said bail having a second ear projecting from an opposite second end and a second side extending from said second ear to couple to said second straight portion for coupling said second end of said bail to said second straight portion with said bail defining a slot between said first and second sides;
   a first notch formed between said first straight portion and said first side, and a second notch formed between said second straight portion and said second side for suspending the bag when attached to said bail with at least a portion of the peripheral edge wrapped about said bail and one of said external and internal faces in direct contact with said first and second ears.

9. The support set forth in claim 8 wherein said frame member includes a top member connected between said first and second straight portions and disposed substantially parallel to said bail for defining a slot.

10. The support set forth in claim 9 wherein said first notch is further defined by a connection between said first straight portion and one end of said top member and wherein said second notch is further defined by a connection between said second straight portion and an opposing end of said top member.

11. The support set forth in claim 8 wherein said first ear of said bail extends laterally beyond said first notch.

12. The support set forth in claim 11 wherein said second ear of said bail extends laterally beyond said second notch.

13. An apparatus comprising:
   an outer frame member and an inner frame member pivotable with respect one another about a pivot axis between a first position wherein said frame members are substantially aligned with respect to one another and a second position wherein said frame members are transverse with respect to one another;
   said outer frame member including first and second outer straight portions interconnected by an outer top member with a first outer incurvate portion defined by an intersection of said first outer straight portion and one end of said outer top member and a second outer incurvate portion defined by an intersection of said second outer straight portion and an opposing end of said outer top member with said first and second outer incurvate portions of said outer frame member being spaced from said pivot axis and from each other;
   said inner frame member including first and second inner straight portions interconnected by an inner top member with a first inner incurvate portion defined by an intersection of said first inner straight portion and one end of said inner top member and a second inner incurvate portion defined by an intersection of said second inner straight portion and an opposing end of said inner top member with said first and second inner incurvate portions of said inner frame member being spaced from said pivot axis and from each other;

a first bail having a first ear and a first side at one end and a second ear and a second side at an opposing end with said first side of said first bail coupled to said first outer straight portion and said second side of said first bail coupled to said second outer straight portion for coupling said first bail to said outer frame member and for defining a first slot between said sides of said first bail;

a second bail having a first ear and a first side at one end and a second ear and a second side at an opposing end with said first side of said second bail coupled to said first inner straight portion and said second side of said second bail coupled to said second inner straight portion for coupling said second bail to said inner frame member and for defining a second slot between said sides of said second bail;

a first outer excurvate portion formed between one end of said outer top member and said first side of said first bail and a second outer excurvate portion formed between an opposing end of said outer top member and said second side of said first bail for suspending a portion of a bag when attached to said first bail with a portion of a peripheral edge of the bag wrapped about said first bail and one of an external and internal face of the bag in direct contact with said first and second ears of said first bail; and a first inner excurvate portion formed between one end of said inner top member and said first side of said second bail and a second inner excurvate portion formed between an opposing end of said inner top member and said second side of said second bail for suspending an opposing portion of the bag when attached to said second bail with an opposing portion of the peripheral edge of the bag wrapped about said second bail and one of an external and internal face of the bag in direct contact with said first and second ears of said second bail.

14. The apparatus of claim 13 wherein said first and second outer excurvate portions are spaced further from said pivot axis relative to said first and second outer incurvate portions.

15. The apparatus of claim 14 wherein said first and second inner excurvate portions are spaced further from said pivot axis relative to said first and second inner incurvate portions.

16. The apparatus of claim 13 wherein said first outer excurvate portion is disposed adjacent said first outer incurvate portion and wherein said second outer excurvate portion is disposed adjacent said second outer incurvate portion.

17. The apparatus of claim 16 wherein said first inner excurvate portion is disposed adjacent said first inner incurvate portion and wherein said second inner excurvate portion is disposed adjacent said second inner incurvate portion.

18. The apparatus of claim 13 wherein said first and second outer incurvate portions extend toward one another and wherein said first and second inner incurvate portions extend toward one another.

* * * * *

UNITED STATES PATENT AND TRADEMARK OFFICE
CERTIFICATE OF CORRECTION

| | | |
|---|---|---|
| PATENT NO. | : 7,731,134 B1 | Page 1 of 1 |
| APPLICATION NO. | : 11/397147 | |
| DATED | : June 8, 2010 | |
| INVENTOR(S) | : George Mutert | |

It is certified that error appears in the above-identified patent and that said Letters Patent is hereby corrected as shown below:

On the Title Page Item (60) under Related U.S. Application Data:

Please add "Provisional application No. 60/537,441, filed on January 16, 2004".

Signed and Sealed this

Thirteenth Day of July, 2010

David J. Kappos
*Director of the United States Patent and Trademark Office*